United States Patent
Keller et al.

(10) Patent No.: US 9,898,378 B2
(45) Date of Patent: Feb. 20, 2018

(54) SMART SELECTION OF A STORAGE MODULE TO BE EXCLUDED

(71) Applicant: International Business Machines Corporation, Armonk, NY (US)

(72) Inventors: Michael Keller, Haifa (IL); Ofer Leneman, Kfar Saba (IL); Osnat Shasha, Holon (IL); Lior Shlomov, Or Yehuda (IL); Ariel Waizel, Nes Ziona (IL)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/936,936

(22) Filed: Nov. 10, 2015

(65) Prior Publication Data
US 2017/0132100 A1    May 11, 2017

(51) Int. Cl.
G06F 11/00    (2006.01)
G06F 11/20    (2006.01)

(52) U.S. Cl.
CPC .... *G06F 11/2094* (2013.01); *G06F 2201/805* (2013.01); *G06F 2201/85* (2013.01)

(58) Field of Classification Search
CPC .. G06F 11/0709; G06F 11/20; G06F 11/2094; G06F 11/3006; G06F 2201/85; G06F 2201/805
See application file for complete search history.

(56) References Cited

U.S. PATENT DOCUMENTS

| | | | | |
|---|---|---|---|---|
| 6,163,855 A * | 12/2000 | Shrivastava | ........ | G06F 11/1443 709/208 |
| 6,178,529 B1 * | 1/2001 | Short | ................. | G06F 11/2038 709/223 |
| 6,189,111 B1 * | 2/2001 | Alexander | .......... | G06F 11/1482 714/13 |
| 6,243,825 B1 * | 6/2001 | Gamache | ................ | H04L 12/24 709/228 |
| 6,279,032 B1 * | 8/2001 | Short | ................. | H04L 67/1002 709/208 |
| 6,401,120 B1 * | 6/2002 | Gamache | ............ | G06F 11/1482 709/220 |
| 6,449,734 B1 * | 9/2002 | Shrivastava | ........ | G06F 11/1425 707/999.008 |

(Continued)

*Primary Examiner* — Joshua P Lottich
(74) *Attorney, Agent, or Firm* — Janaki K. Davda; Konrad, Raynes, Davda and Victor LLP

(57) ABSTRACT

Provided are a computer program product, computer system, and method for smart selection of a storage module to be excluded when a connection between two storage modules is broken. An indication is received from a first storage module that a connection between the first storage module and a second storage module is broken. In response to determining that the second storage module is accessible, values of exclusion criteria for the first storage module are determined and summed to identify a first exclusion total. Then, values of exclusion criteria for the second storage module are determined and summed to identify a second exclusion total. In response to determining that the first exclusion total exceeds the second exclusion total, the second storage node is excluded from the cluster. In response to determining that the second exclusion total exceeds the first exclusion total, the first storage node is excluded from the cluster.

18 Claims, 5 Drawing Sheets

(56) References Cited

U.S. PATENT DOCUMENTS

| | | | |
|---|---|---|---|
| 6,453,426 B1 * | 9/2002 | Gamache | G06F 11/1417 709/249 |
| 6,662,219 B1 * | 12/2003 | Nishanov | H04L 67/10 709/209 |
| 6,665,811 B1 * | 12/2003 | de Azevedo | G06F 11/1425 714/4.1 |
| 6,782,492 B1 * | 8/2004 | Nakaso | G06F 11/0709 714/4.4 |
| 6,947,957 B1 * | 9/2005 | Lange | G06F 11/079 707/687 |
| 7,739,541 B1 * | 6/2010 | Rao | G06F 11/0709 709/205 |
| 7,904,910 B2 | 3/2011 | Romero | |
| 8,108,712 B1 * | 1/2012 | Carlino | G06F 11/0709 714/4.1 |
| 8,108,715 B1 * | 1/2012 | Agarwal | G06F 11/0709 714/10 |
| 2001/0008019 A1 * | 7/2001 | Vert | G06F 11/1662 714/1 |
| 2006/0090095 A1 * | 4/2006 | Massa | G06F 11/1479 714/4.11 |
| 2008/0253386 A1 * | 10/2008 | Barum | H04L 45/00 370/406 |
| 2009/0113034 A1 | 4/2009 | Krishnappa et al. | |
| 2010/0306573 A1 * | 12/2010 | Gupta | H04L 12/4625 714/4.1 |
| 2011/0289344 A1 * | 11/2011 | Bae | G06F 11/181 714/4.2 |
| 2013/0010675 A1 * | 1/2013 | Huen | H04B 10/1129 370/315 |
| 2013/0039166 A1 * | 2/2013 | Brown | H04L 41/0659 370/216 |
| 2013/0254599 A1 * | 9/2013 | Katkar | H04L 43/0811 714/57 |
| 2013/0286893 A1 | 10/2013 | Zhu et al. | |
| 2014/0149783 A1 * | 5/2014 | Georgiev | G06F 11/0793 714/4.2 |
| 2015/0113312 A1 * | 4/2015 | Velayudhan | G06F 11/2092 714/4.11 |
| 2016/0036924 A1 * | 2/2016 | Koppolu | H04L 67/16 709/224 |
| 2016/0140001 A1 * | 5/2016 | Kulkarni | G06F 11/2033 714/4.12 |
| 2017/0052707 A1 * | 2/2017 | Koppolu | G06F 9/5061 |
| 2017/0123945 A1 * | 5/2017 | Panasko | G06F 11/2094 |

* cited by examiner

SMART SELECTION OF A STORAGE MODULE TO BE EXCLUDED

BACKGROUND OF THE INVENTION

1. Field of the Invention

Embodiments of the present invention relate to a computer program product, computer system, and method for smart election of a storage module to be excluded when a connection between two storage modules is broken in a mesh storage cluster. In addition, embodiments of the present invention relate to a computer program product, computer system, and method for smart selection of a storage module to be excluded in a mesh storage cluster upon intra-module connection failure.

2. Description of the Related Art

Grid (or "cluster") storage includes multiple storage modules for providing storage. In a grid based storage system, a cluster topology may be a mesh cluster, especially for a low cost entry level offering for smaller customers and proof of concepts. A mesh cluster may be described as a cluster in which every storage module is directly linked to any other storage module in the cluster.

Each of the storage modules in the cluster is connected to the other in a point to point topology. In an event in which a connection (i.e., an intra-module connection) between any two storage modules is broken ("an intra-module connection failure"), one approach is to exclude one of the two connected storage modules and continue with the rest, N−1 storage modules. This is to avoid a system performance degradation of the cluster because communicating via a third module instead of a direct connection slows system responsiveness and performance degradation as compared to expelling one of the two storage modules from the cluster.

In some cases, the selection of the storage module to be excluded is determined based on the first storage module that complains that there is a broken connection to an adjacent module. A cluster manager excludes the adjacent module. A broken connection indications that the two storage modules cannot transfer data to each other. "Adjacent" may be described as two adjacent storage modules having a point to point connection.

However, in some cases, this approach is not optimized, especially in cases where it is more suitable to exclude the first storage module that complained in order to avoid a performance degradation, for example.

SUMMARY

Provided are a computer program product, system, and method for smart election of a storage module to be excluded when a connection between two storage modules is broken. An indication is received from a first storage module that a connection between the first storage module and a second storage module is broken. In response to determining that the second storage module is accessible, values of exclusion criteria for the first storage module are determined, and the values of the exclusion criteria are summed up to identify a first exclusion total. Then, values of exclusion criteria for the second storage module are determined, and the values of the exclusion criteria are summed to identify a second exclusion total. In response to determining that the first exclusion total exceeds the second exclusion total, the second storage node is excluded from the cluster. In response to determining that the second exclusion total exceeds the first exclusion total, the first storage node is excluded from the cluster.

DETAILED DESCRIPTION

When a storage module complains that a connection is broken with an adjacent storage module, embodiments determine which of the storage modules sharing the broken connection should be excluded from further use based on the functionality of each of the two storage modules.

Figure 1:
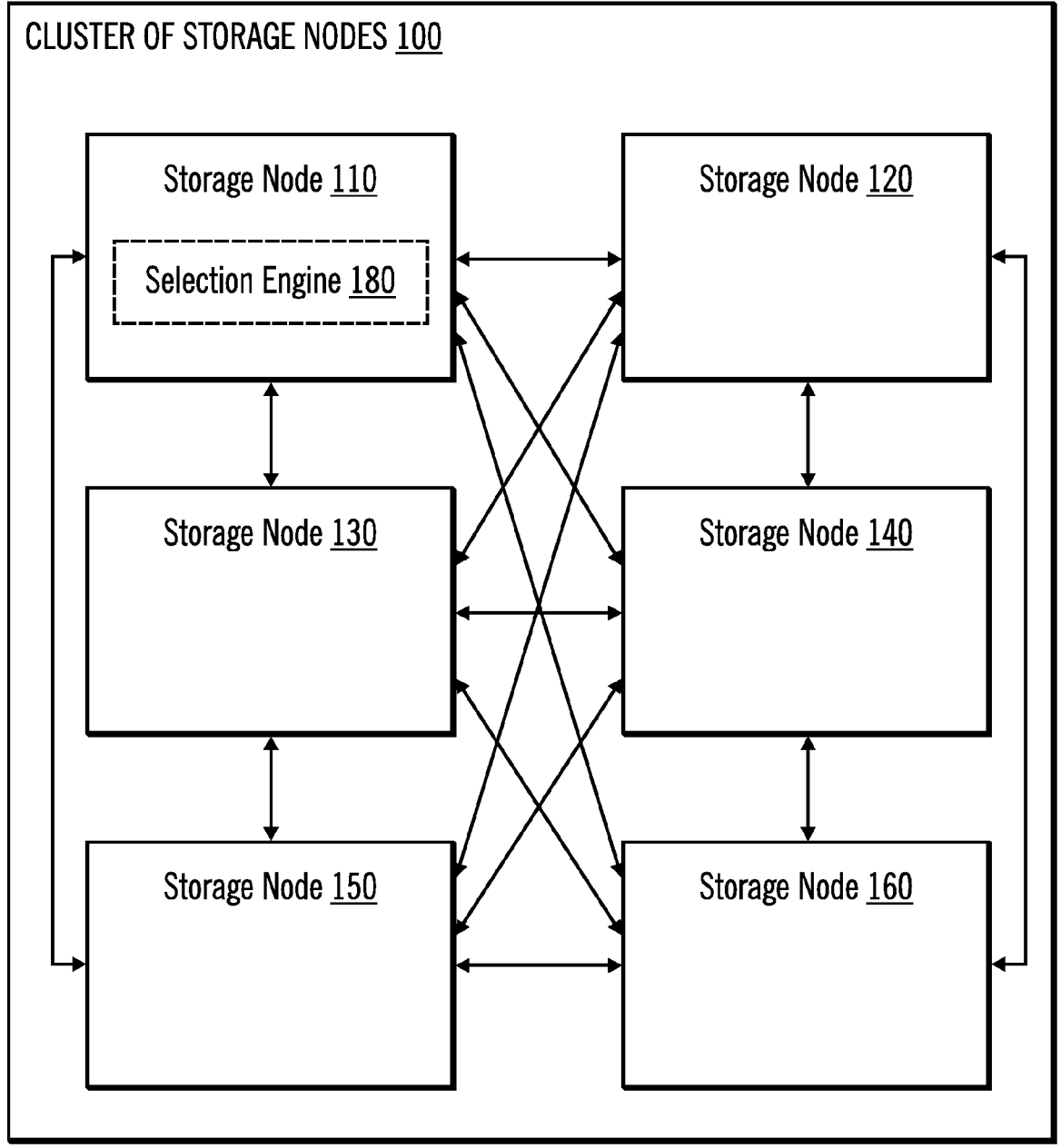
FIG. 1 illustrates, in a block diagram, a cluster of storage modules in accordance with certain embodiments.

FIG. 1 illustrates, in a block diagram, a cluster of storage modules 100 in accordance with certain embodiments. The cluster of storage modules 100 includes storage modules 110, 120, 130, 140, 150, 160. Although storage nodes 110, 120, 130, 140, 150, 160 are shown in FIG. 1 as an example, a cluster of storage nodes 100 may have any number of storage nodes.

In certain embodiments, the cluster of storage modules 100 is a mesh cluster in which each of the storage modules 110, 120, 130, 140, 150, 160 in the cluster is connected to at least one other storage module in a point to point topology. Although a few storage modules are illustrated in FIG. 1, there may be any number of storage modules in the cluster.

In certain embodiments, one of the storage modules 110, 120, 130, 140, 150, 160, . . . is a cluster manager storage module that includes the selection engine 180 and performs the selection of the storage module to exclude for all of the storage modules 110, 120, 130, 140, 150, 160, . . . in the cluster of storage modules 100. In certain other embodiments, each of the storage modules 110, 120, 130, 140, 150, 160, . . . includes a selection engine 180. In FIG. 1, storage node 110 includes a selection engine 180.

Figure 2:
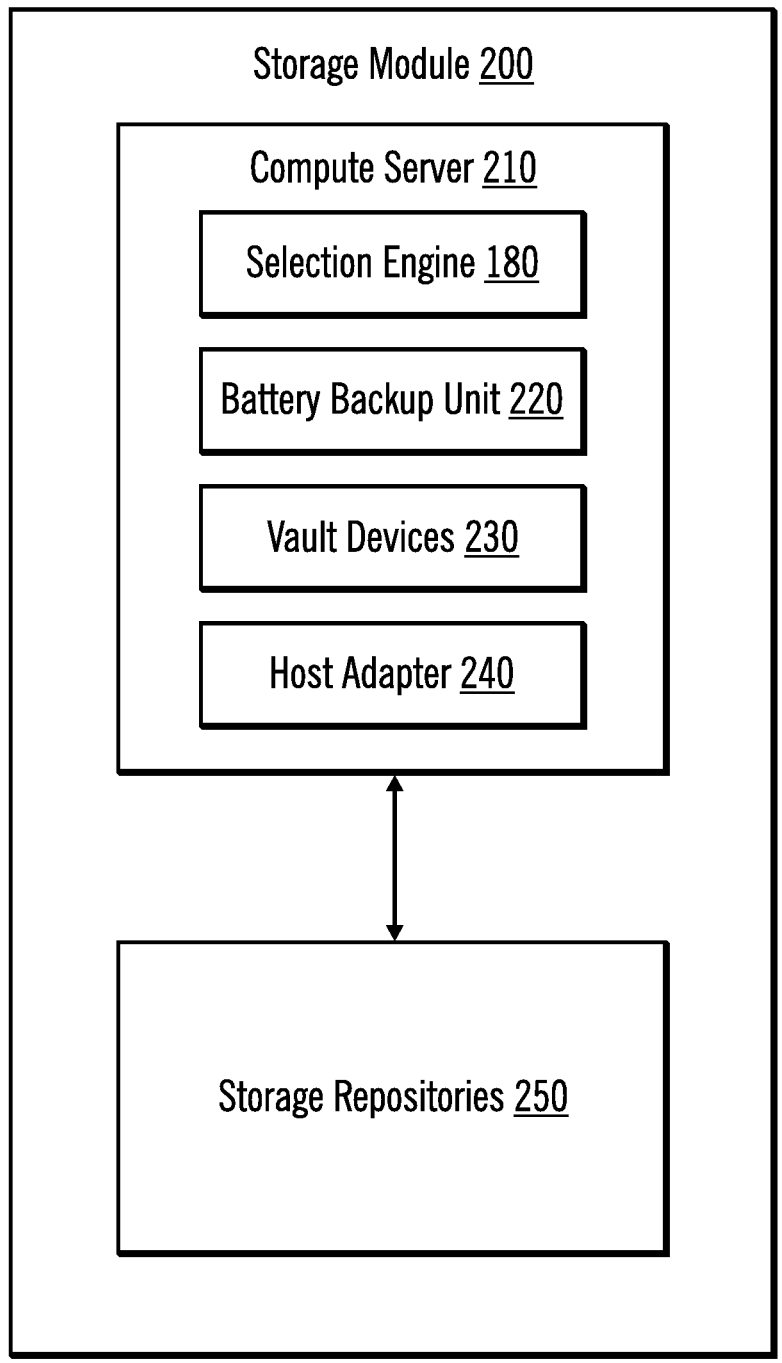
FIG. 2 illustrates, in a block diagram, an example storage module in accordance with certain embodiments.

FIG. 2 illustrates, in a block diagram, an example storage module 200 in accordance with certain embodiments. The storage module 200 includes a compute server 210 that is coupled to storage repositories 250 (e.g., hard disk, tape, flash drive, solid state drive, etc.). The compute server 210 may include a selection engine 180. In certain embodiments, each of the storage modules 110, 120, 130, 140, 150, 160 has the form of storage module 200. In certain embodiments, one of the storage modules 110, 120, 130, 140, 150, 160, . . . is a cluster manager storage module that includes the selection engine 180 and performs the selection of the storage module to exclude for all of the storage modules 110, 120, 130, 140, 150, 160, . . . in the cluster of storage modules 100. In certain other embodiments, each of the storage modules 110, 120, 130, 140, 150, 160 includes a selection engine 180. The compute server 210 includes battery backup unit 220, vault devices 230, and a host adapter 240.

The selection engine 180 selects the storage module to be excluded from the cluster based on module functionality contribution. With embodiments, the contribution weight function is derived from two factors: storage data plane related exclusion criteria (e.g., status of communication between a storage module and a data plan, status of the vault devices in the storage module, etc.) and the storage module impact on cluster total reliability and availability.

With embodiments, when a storage module indicates that it cannot communicate with one of its peer storage modules in the cluster, the selection engine 180 (e.g., at the cluster manager storage module) will check if the adjacent storage module is accessible at all (e.g., check if that storage module is up and operational). If the adjacent storage module is not accessible (e.g., has failed and is not operational), then the selection engine excludes the adjacent storage module from the cluster Exclusion of the storage module means that the storage module does not take part in the cluster I/O processing anymore and no requests are sent to that storage module. In certain embodiments, the data at each storage module is replicated to at least one other storage module. For example, if there is replication of data at three storage modules, when one storage module is excluded from the cluster, then the data may be replicated to a new, third storage module to maintain three copies of the data.

If the adjacent storage module is accessible, this is an intra-module connection failure. The selection engine 180 checks exclusion criteria of each one of the two adjacent modules. In certain embodiments, the exclusion criteria includes one or more of:
- whether each storage module is accessible by other storage modules in the storage cluster;
- battery backup unit availability and capacity of each storage module (e.g., where the battery backup unit provides power in case of other power loss);
- data path latency of each storage module;
- vault devices availability on each storage module (e.g., whether the hardware and communications to the vault devices work);
- the ability of each storage module to backup its data on an emergency shutdown; and
- host adapter availability and state of each storage module.

In other embodiments, other exclusion criteria may be used or a subset of these exclusion criteria may be used.

The selection engine 180 analyzes the results of checking the exclusion criteria and determines which of the storage modules to exclude. In certain embodiments, the decision is made by giving a weight to each one of the exclusion criteria. Based on the total weight of the exclusion criteria of each module, the selection engine 180 excludes one of the two storage modules from the cluster.

In certain embodiments, a weight is maintained for each storage module in advance. The weight of each storage module may be described as a "value" that is calculated by taking into account the weight of each criteria. The weight may be periodically updated by the selection engine 180 (e.g., based upon analysis or based upon input from a user). Then, upon an intra-module connection failure, the weight may be used to determine which of the two storage modules to exclude. In certain embodiments, if both storage modules have the same or a similar (e.g., within a predetermined certain range of each other) contribution score, the selection engine 180 may exclude the storage module that raised the error.

Figure 3A:
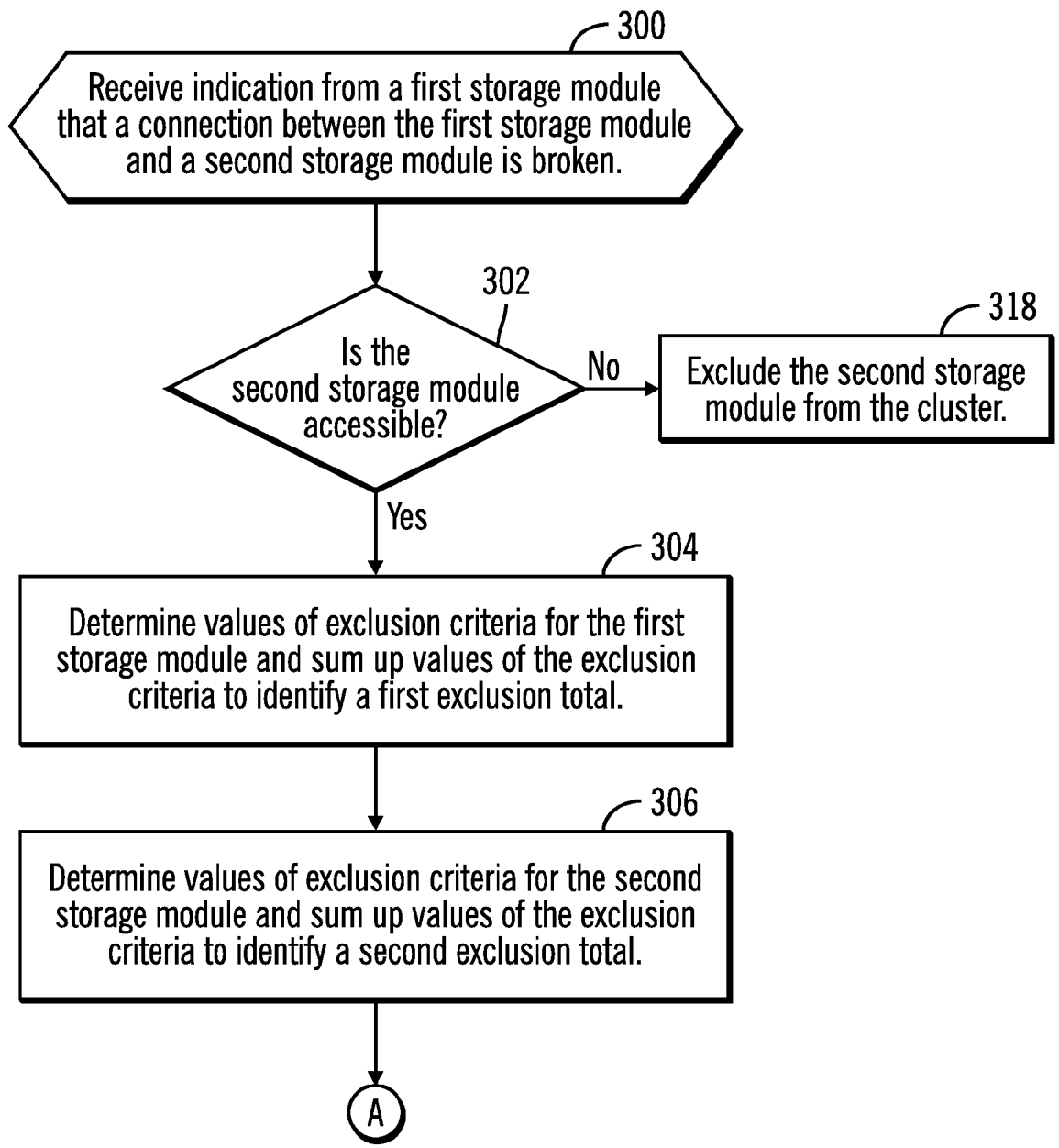
FIGS. 3A and 3B illustrate, in a flowchart, operations for selection of a storage module to exclude from a cluster in response to a connection failure in accordance with certain embodiments.
Figure 3B:
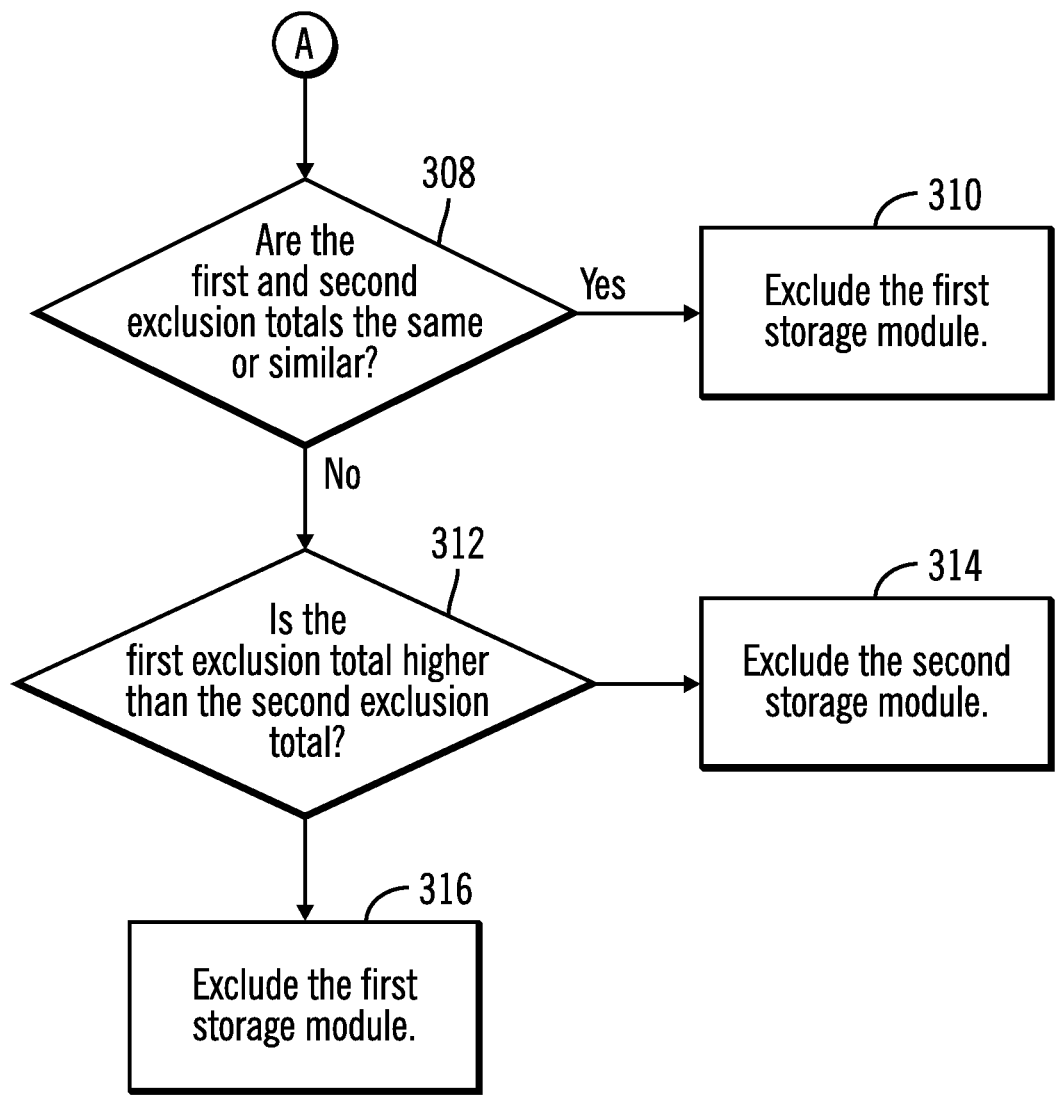

FIGS. 3A and 3B illustrate, in a flowchart, operations for selection of a storage module to exclude from a cluster in response to a connection failure in accordance with certain embodiments. Control begins at block 300 with the selection engine 180 receiving indication from a first storage module that a connection between the first storage module and a second storage module is broken. The first storage module and the second storage module are in a cluster of storage modules.

In block 302, the selection engine 180 determines whether the second storage module accessible. If so, processing continues to block 304, otherwise, processing continues to block 320.

In block 304, the selection engine 180 determines values of exclusion criteria for the first storage module and sum up values of the exclusion criteria to identify a first exclusion total. In block 306, the selection engine 180 determines values of exclusion criteria for the second storage module and sum up values of the exclusion criteria to identify a second exclusion total. From block 306 (FIG. 3A), processing continues to block 308 (FIG. 3B).

In block 308, the selection engine 180 determines whether the first and second exclusion totals the same or similar. If so, processing continues to block 310, otherwise, processing continues to block 312. In block 310, the selection engine 180 excludes the first storage module.

In block 312, the selection engine 180 determines whether the first exclusion total is higher than the second exclusion total. If so, processing continues to block 314, otherwise, processing continues to block 316. In block 314, the selection engine 180 excludes the second storage module. In block 316, the selection engine 180 excludes the first storage module.

In block 318 (FIG. 3A), the selection engine 180 excludes the second storage module from the cluster.

Embodiments, in a degraded operating state of storage as a service, apply a cluster storage module removal election procedure (based on scoring of exclusion criteria) to a mesh storage cluster, the selection engine 180 analyzes the results and decide which of the module to exclude. The decision is made by giving a weight to each one of the exclusion criteria. Based on the total weight of all criteria's of each storage module, the cluster will exclude one of the storage modules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as a, b, c, used to designate a number of instances of an element may indicate a variable number of instances of that element when used with the same or different elements.

Figure 4:
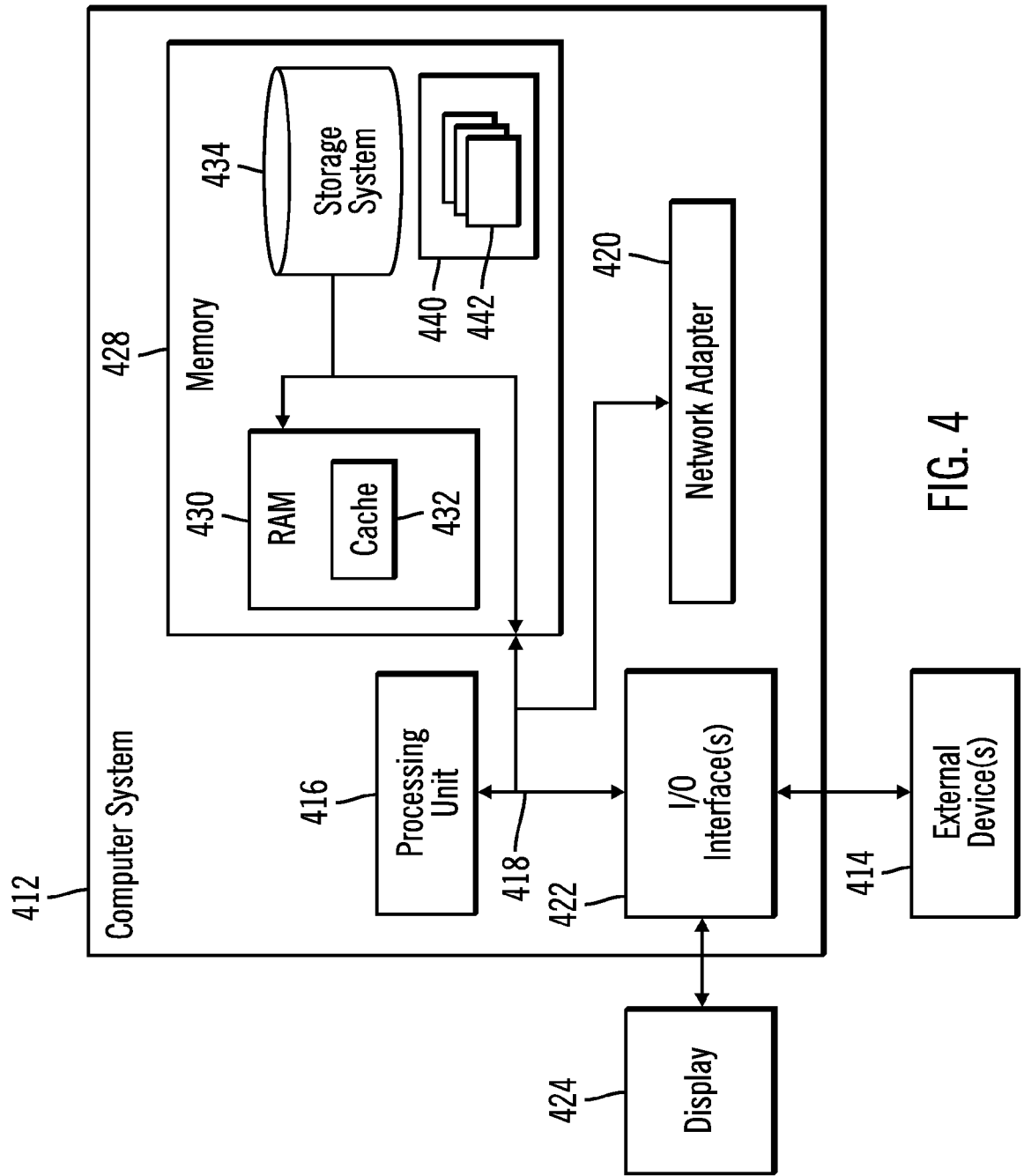
FIG. 4 illustrates a computing environment in which components of FIG. 1 may be implemented in accordance with certain embodiments.

The storage modules 110, 120, 130, 140, 150, 160 of FIG. 1 may each be implemented in a computer system, such as the computer system 412 shown in FIG. 4. Computer system 412 may be described in the general context of computer system executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors or processing units 416, a system memory 428, and a bus 418 that couples various system components including system memory 428 to one or more processors or processing units 416. Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 412 typically includes a variety of computer system readable media. Such media may be any available media that is accessible by computer system 412, and it includes both volatile and non-volatile media, removable and non-removable media.

System memory 428 can include computer system readable media in the form of volatile memory, such as random access memory (RAM) 430, which includes cache memory 432. Computer system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. The components of the computer system 412 may be implemented as program modules 442 which generally carry out the functions and/or methodologies of embodiments of the invention as described herein.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via Input/Output (I/O) interfaces 422. Still yet, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components may be used in conjunction with computer system 412. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a non-transitory computer readable storage medium having computer readable program code embodied therein that executes to perform operations, the operations comprising:
  receiving an indication from a first storage module in a cluster that a connection between the first storage module and a second storage module in the cluster is broken; and
  in response to determining that the second storage module is accessible,
    determining values of first exclusion criteria for the first storage module, wherein the first exclusion criteria comprises battery backup unit availability and capacity of the first storage module, data path latency of the first storage module, vault device availability of the first storage module, an ability of the first storage module to backup data on an emergency shutdown, and host adapter availability of the first storage module;

summing up values of the first exclusion criteria to identify a first exclusion total;

determining values of second exclusion criteria for the second storage module wherein the second exclusion criteria comprises battery backup unit availability and capacity of the second storage module, data path latency of the second storage module, vault device availability of the second storage module, an ability of the second storage module to backup data on an emergency shutdown, and host adapter availability of the second storage module;

summing up values of the second exclusion criteria to identify a second exclusion total;

in response to determining that the first exclusion total exceeds the second exclusion total, excluding the second storage module from the cluster; and in response to determining that the second exclusion total exceeds the first exclusion total, excluding the first storage module from the cluster.

2. The computer program product of claim 1, wherein the first storage module and the second storage module are adjacent in a mesh cluster of storage modules.

3. The computer program product of claim 1, wherein the operations further comprise:

in response to determining that the second storage module is not accessible, excluding the second storage module from the cluster.

4. The computer program product of claim 1, wherein weights are associated with each of the first exclusion criteria and each of the second exclusion criteria.

5. The computer program product of claim 1, wherein weights are associated with the first storage module and the second storage module.

6. The computer program product of claim 1, wherein the operations further comprise:

in response to determining that the first exclusion total and the second exclusion total are equal, excluding the first storage module from the cluster.

7. A computer system, comprising:

a cluster of storage modules, wherein each of the storage modules includes a processor and a computer readable storage medium having program code; and wherein the program code, when executed on at least one of the storage modules in the cluster of storage modules, performs operations, the operations comprising:

receiving an indication from a first storage module in the cluster that a connection between the first storage module and a second storage module in the cluster is broken; and in response to determining that the second storage module is accessible, determining values of first exclusion criteria for the first storage module, wherein the first exclusion criteria comprises battery backup unit availability and capacity of the first storage module, data path latency of the first storage module, vault device availability of the first storage module, an ability of the first storage module to backup data on an emergency shutdown, and host adapter availability of the first storage module;

summing up values of the first exclusion criteria to identify a first exclusion total;

determining values of second exclusion criteria for the second storage module, wherein the second exclusion criteria comprises battery backup unit availability and capacity of the second storage module, data path latency of the second storage module, vault device availability of the second storage module, an ability of the second storage module to backup data on an emergency shutdown, and host adapter availability of the second storage module;

summing up values of the second exclusion criteria to identify a second exclusion total;

in response to determining that the first exclusion total exceeds the second exclusion total, excluding the second storage module from the cluster; and in response to determining that the second exclusion total exceeds the first exclusion total, excluding the first storage module from the cluster.

8. The computer system of claim 7, wherein the first storage module and the second storage module are adjacent in a mesh cluster of storage modules.

9. The computer system of claim 7, wherein the operations further comprise:

in response to determining that the second storage module is not accessible, excluding the second storage module from the cluster.

10. The computer system of claim 7, wherein weights are associated with each of the first exclusion criteria and each of the second exclusion criteria.

11. The computer system of claim 7, wherein weights are associated with the first storage module and the second storage module.

12. The computer system of claim 7, wherein the operations further comprise:

in response to determining that the first exclusion total and the second exclusion total are equal, excluding the first storage module from the cluster.

13. A method, comprising:

receiving an indication from a first storage module in a cluster that a connection between the first storage module and a second storage module in the cluster is broken; and in response to determining that the second storage module is accessible, determining values of first exclusion criteria for the first storage module, wherein the first exclusion criteria comprises battery backup unit availability and capacity of the first storage module, data path latency of the first storage module, vault device availability of the first storage module, an ability of the first storage module to backup data on an emergency shutdown, and host adapter availability of the first storage module;

summing up values of the first exclusion criteria to identify a first exclusion total;

determining values of second exclusion criteria for the second storage module, wherein the second exclusion criteria comprises battery backup unit availability and capacity of the second storage module, data path latency of the second storage module, vault device availability of the second storage module, an ability of the second storage module to backup data on an emergency shutdown, and host adapter availability of the second storage module;

summing values of the second exclusion criteria to identify a second exclusion total;

in response to determining that the first exclusion total exceeds the second exclusion total, excluding the second storage module from the cluster; and in response to determining that the second exclusion total exceeds the first exclusion total, excluding the first storage module from the cluster.

14. The method of claim 13, wherein the first storage module and the second storage module are adjacent in a mesh cluster of storage modules.

15. The method of claim 13, further comprising:
   in response to determining that the second storage module is not accessible, excluding the second storage module from the cluster.

16. The method of claim 13, wherein weights are associated with each of the first exclusion criteria and each of the second exclusion criteria.

17. The method of claim 13, wherein weights are associated with the first storage module and the second storage module.

18. The method of claim 13, further comprising:
   in response to determining that the first exclusion total and the second exclusion total are equal, excluding the first storage module from the cluster.

* * * * *